(12) United States Patent
Mirabile

(10) Patent No.: US 7,621,253 B2
(45) Date of Patent: Nov. 24, 2009

(54) INTERNAL TURBINE-LIKE TOROIDAL COMBUSTION ENGINE

(76) Inventor: Nicholas F. Mirabile, P.O. Box 610086, Dallas, TX (US) 75261

( * ) Notice: Subject to any disclaimer, the term of this patent is extended or adjusted under 35 U.S.C. 154(b) by 0 days.

(21) Appl. No.: 11/298,100

(22) Filed: Dec. 9, 2005

(65) Prior Publication Data
US 2007/0131182 A1 Jun. 14, 2007

(51) Int. Cl.
*F02B 53/08* (2006.01)
*F02B 53/04* (2006.01)
*F02B 33/00* (2006.01)

(52) U.S. Cl. .................. 123/213; 123/228; 123/229; 123/559.1

(58) Field of Classification Search ............ 123/226, 123/224, 223, 44 R, 44 D, 44 E, 18 R, 55.7, 123/55.5, 58.3, 53.6, 213, 215, 228, 559.1; 418/175
See application file for complete search history.

(56) References Cited

U.S. PATENT DOCUMENTS

| | | | | |
|---|---|---|---|---|
| 1,049,643 A | * | 1/1913 | Baker | 123/223 |
| 1,338,304 A | * | 4/1920 | Jefferies | 123/224 |
| 1,486,501 A | * | 3/1924 | Tice | 123/223 |
| 1,889,262 A | * | 11/1932 | Pavlecka | 123/559.1 |
| 2,132,595 A | * | 10/1938 | Bancroft | 123/559.1 |
| 2,189,728 A | * | 2/1940 | Daniels | 123/226 |
| 2,201,785 A | * | 5/1940 | Ney | 123/18 R |
| 2,352,403 A | * | 6/1944 | Pieper | 123/224 |
| 2,558,349 A | * | 6/1951 | Fette | 123/44 E |
| 2,760,466 A | * | 8/1956 | Black, Jr. | 123/228 |
| 3,104,527 A | * | 9/1963 | Gesell | 123/44 E |
| 3,329,132 A | * | 7/1967 | De Coye De Castelet | 123/213 |
| 3,358,439 A | * | 12/1967 | De Coye De Castelet | 123/213 |
| 3,913,534 A | * | 10/1975 | Bratten | 123/213 |
| 4,019,324 A | * | 4/1977 | Coxon | 60/598 |
| 4,078,529 A | * | 3/1978 | Warwick | 123/44 D |
| 4,625,683 A | * | 12/1986 | Bonfilio | 123/44 R |
| 5,181,490 A | * | 1/1993 | Ruzic | 123/226 |
| 5,375,564 A | * | 12/1994 | Gail | 123/44 D |
| 5,954,017 A | * | 9/1999 | Federowicz | 123/44 R |
| 6,257,195 B1 | * | 7/2001 | Vanmoor | 123/239 |

(Continued)

FOREIGN PATENT DOCUMENTS

GB 2195400 A * 4/1988

(Continued)

*Primary Examiner*—Thai Ba Trieu
(74) *Attorney, Agent, or Firm*—Lynn E. Barber

(57) ABSTRACT

A novel combustion engine with turbine like properties is disclosed. The novel engine (10) comprises an air intake, a first compressor stage, coupled to the air intake, a second compressor stage, coupled to the first compressor stage, a transfer valve, placed between the compressor stages and an annular race. Within the annular race, toroidal piston travels and passes over the transfer valve. The valve, toroidal piston and race form a temporary combustion chamber that expands as the piston travels within the annular race. Compressed air and fuel are introduced into the temporary combustion chamber and ignited to release the chemical energy and force the turbine piston to travel faster within the annular race. The first compressor stage is rotatably coupled to a crank shaft, which drives the first compressor stage and connects to an armature, which also connects the turbine piston so that useful work can be extracted from the energy released from the combustion of the fuel-air mixture.

20 Claims, 12 Drawing Sheets

U.S. PATENT DOCUMENTS

| | | | |
|---|---|---|---|
| 6,854,437 B1 * | 2/2005 | Vazquez | 123/248 |
| 6,928,965 B2 * | 8/2005 | Teufl | 123/18 R |
| 2004/0211398 A1 * | 10/2004 | Knight | 123/559.1 |
| 2005/0263128 A1 * | 12/2005 | Yadegar | 123/226 |
| 2006/0157036 A1 * | 7/2006 | Andersen | 123/559.1 |

FOREIGN PATENT DOCUMENTS

WO    WO 2005083246 A1 *    9/2005

* cited by examiner

INTERNAL TURBINE-LIKE TOROIDAL COMBUSTION ENGINE

This patent application claims priority on U.S. Provisional Patent Application No. 60/546,577 filed Feb. 20, 2004, entitled "A NOVEL INTERNAL COMBUSTION TURBINE ENGINE," and on U.S. patent application Ser. No. 11/009,493, filed Dec. 11, 2004, entitled "A NOVEL INTERNAL COMBUSTION TOROIDAL ENGINE," both invented by Nicholas F. Mirabile, and PCT Patent Application No. PCT/US2005/005539, published Sep. 9, 2005, which is based on above U.S. patent applications, herein incorporated by reference for all purposes.

BACKGROUND

The present invention relates to internal combustion engines, namely, to an engine that isolates the combustion chamber from a compression chamber and directs the combusted fuel mixture tangentially against a drive wheel.

There are many types of engines that have been developed over the past 250 years. The evolution of engines began with steam engines, which were an external combustion engine, but were dangerous and inefficient. Stirling engines were developed because of the danger of the early steam engines. Stirling engines are still used where quiet operation is greatly desired. They too are external combustion engines. Next came internal combustion engines. These include two stoke gasoline and diesel engines, four stroke gasoline and diesel engines, and turbine engines.

Two stroke engines are the engine of choice for limited use with great power production. They are simpler than four stroke engines, such as those found in automobiles, because of the lack of valves. Further, two stroke engines fire every revolution as opposed to once every other revolution compared to four stroke engines. Two stroke engines can work in any orientation, which is advantageous in applications, such as garden or yard tools like an edger or chain saw. A four stroke engine, by contrast, uses oil for lubricating the crank shaft and pistons and managing the oil flow could be troublesome and add to the complexity of the engine to solve this problem.

Unfortunately, two stroke gasoline engines have several problems as compared to a four stroke gasoline engine. One is that the compression of the air-fuel mixture causes leaking past the cylinder out the exhaust port during each cycle. This leaking is an environmental hazard. Further, two stroke engines do not last as long as a four stroke engine. The lack of a dedicated lubrication system means that the parts of a two stroke engine wear a lot faster than those in a four stroke engine. Further, two stroke engine oil, mixed with the fuel to provide lubrication, is expensive and is consumed at a rate of about one gallon for every 1,000 miles if used as a car engine. Lastly, two stroke engines are less efficient than four stroke engines, so fuel economy would suffer.

A two stroke diesel engine, by contrast, which only compresses air and then injects the fuel directly into the compressed air, is a much better match with the two stroke cycle. This is the engine of choice in large diesel engines, such as those used in heavy machinery, ships, and locomotives.

The diesel engine often utilizes a turbocharger or supercharger to fill the chamber with air prior to the compression step then subsequent fuel injection/combustion step. The forced air into the chamber clears out the burnt fuel exhaust out an exhaust port normally found on the opposite wall of the chamber from that of the intake valve. This design lends itself to large engine applications and is not practical for small engine applications, such as for applications of a gasoline two-stroke or four stroke engine.

A reciprocating internal combustion engine is the engine of choice for mass transit as it is relatively efficient compared to external combustion engines, is relatively inexpensive to build, as compared to gas turbine engines, and relatively easy to refuel, as compared to electric cars. The standard internal combustion engine uses a four stroke cycle that includes, drawing in a fuel air mixture, compression of that mixture, ignition and rapid expansion, then exhausting of the spent fuel exhaust before the cycle repeats. The engine can be cooled internally, via a radiator coolant system, to prolong life and efficiency, or it can be air cooled, utilizing radiating fins.

The four stroke engine can be very efficient, but it loses power as compared to a two stroke engine since twice as many steps must be performed, meaning that only one combustion for every two revolutions can occur. A four stroke diesel engine operates much as a gas engine does, except it relies upon a higher compression of the air, with no fuel mixed prior to compression and then added just before combustion due to the high pressure. The higher the pressure, the greater the power released during the combustion stage. An exhaust step occurs after combustion prior to beginning again and drawing a new supply of air to compress. Since the fuel is added just before combustion, a higher air compression can be achieved, resulting in higher power output for the same cylinder displacement of that of a gas engine.

In a gas turbine, a pressurized gas spins the turbine. In all modern gas turbine engines, the engine produces its own pressurized gas, and it does this by burning something like propane, natural gas, kerosene or jet fuel. The heat that comes from burning the fuel expands air, and the high-speed rush of this hot air spins the turbine. Gas turbine engines have a great power to weight ratio as compared to reciprocating engines. Gas turbine engines also are smaller than their reciprocating counter parts of the same power. Gas turbine engines utilize a compressor to compress incoming air to a high pressure, a combustion area, to burn the fuel and produce high pressure, high velocity gas, and a turbine, to extract the energy from the high pressure, high velocity gas flowing from the combustion chamber.

The main disadvantage of gas turbines is that, compared to a reciprocating engine of the same size, they are expensive. They spin at such high speeds and such high temperatures that designing and manufacturing gas turbines is very difficult from an engineering and materials perspective. Gas turbines also tend to use more fuel when they are idling, and they prefer constant rather than a fluctuating load. This explains why they are more suited for aircraft use and not for conventional automobiles, although military applications have led to the use of a gas turbine in tanks.

What is needed is an efficient internal combustion engine that avoids the environmental limitations of a conventional two stroke gasoline engine. Further, what is needed is an efficient internal combustion engine that optimizes power output with respect to the direction of force to turn a drive shaft. Further still, what is needed is an efficient internal combustion engine that can be compact, saves fuel, and optimizes power over that of the prior art.

SUMMARY OF THE INVENTION

According to the present invention, a novel combustion engine with turbine like properties is disclosed. The novel engine comprises an air intake, a first compressor stage, coupled to the air intake, a second compressor stage, coupled to the first compressor stage, a transfer valve, placed between the compressor stages and an annular race. Within the annular race, a turbine or toroidal piston travels and passes over the transfer valve. The valve, toroidal piston and race form a temporary combustion chamber that expands as the piston travels in its circular path within the annular race. Compressed air and fuel are introduced into the temporary combustion chamber and ignited to release the chemical energy and force the turbine piston to travel faster within the annular race. The first compressor stage is rotatably coupled to a crank shaft, which drives the first compressor stage. An armature connects the turbine piston to the drive shaft so that the movement of the piston will move the armature. The armature is further connected to the drive shaft so that useful work can be extracted from the energy released from the combustion of the fuel-air mixture.

The fuel can be, but is not limited to, gasoline, diesel, propane, natural gas, kerosene, jet fuel. In the event that gasoline or other flammable fuels are consumed, a spark plug is utilized as an igniting element or ignitor. Should the engine use diesel or other fuels that can combust at sufficient enough pressure, no ignitor is necessary other than achieving the high pressure necessary to cause combustion. During cold weather, since pressure is proportional to heat and the compression chamber may be too cold for the pressure to cause combustion, a glow plug can be included to begin the combustion cycle until the engine warms enough to spontaneously bring about combustion.

The engine includes a second combustion chamber and compression chamber aligned opposed to the first compression chamber and combustion chamber and within a common plane such that the engine can provide two combustion cycles per rotation of the turbine piston. Additional opposing compression chambers and combustion chamber arrangements can be included, with one shifted 90 degrees to the orientation of the first set of opposing compression pistons, resulting in four combustions per turbine piston revolution.

The novel engine operates according to the method steps as follows: deriving power within a combustion engine having a turbine piston by intaking air; compressing the intake air within a first compression stage; delivering the compressed air to a second compression stage; compressing the air a second time by the second compression stage; forming a temporary combustion chamber; directing the compressed air to the temporary combustion chamber; injecting fuel within the directed compressed air; igniting the compressed fuel/air mixture within the temporary combustion chamber to combust the fuel/air mixture thereby pushing the turbine piston; and repeating these steps thereby deriving power from the combustion events within the temporary combustion chamber.

These and other features of the present invention will be understood upon the reading of the following description in conjunction with the Figures.

DETAILED DESCRIPTION OF SPECIFIC EMBODIMENTS OF THE INVENTION

Figure 1:
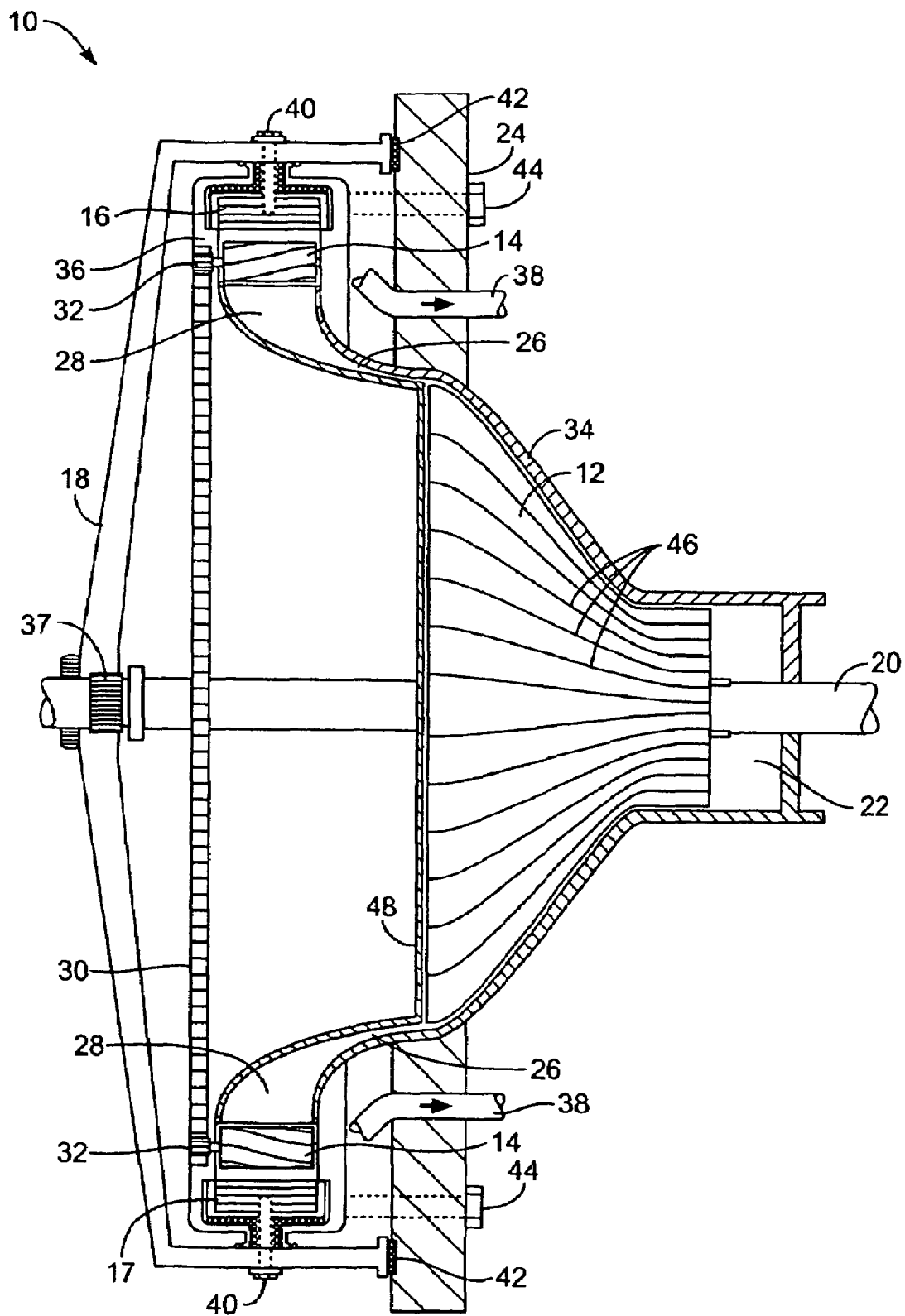
FIG. 1 is a cutaway illustration of the engine as embodied in the present invention.
Figure 2:
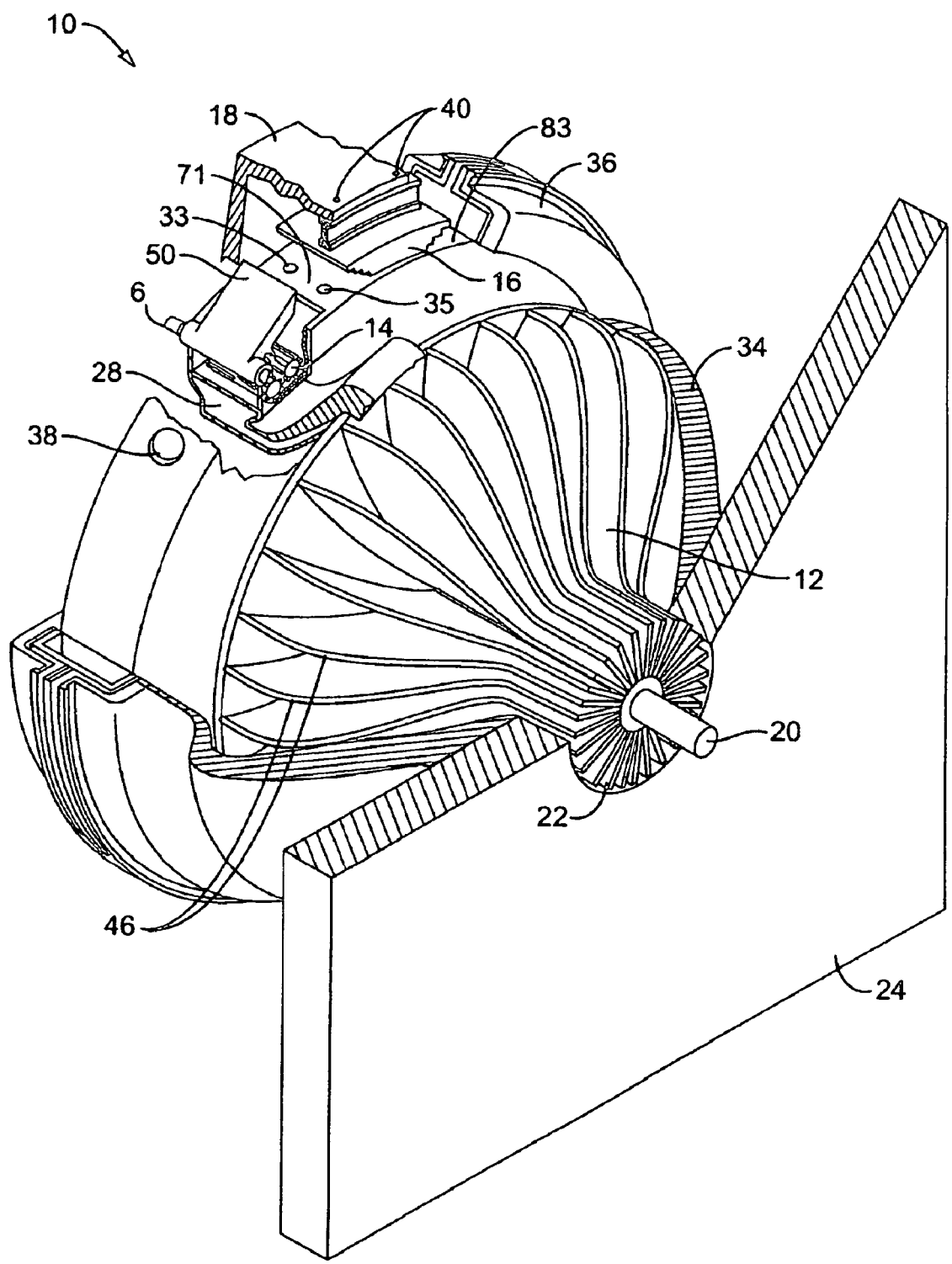
FIG. 2 is a perspective cutaway view of the engine in accordance with a specific embodiment of the invention.

A novel engine is disclosed that is an improvement over the prior art. Engine 10 is illustrated in FIGS. 1 and 2 and is a multistage compression, air chamber trap engine with turbine like features that eschews reciprocating pistons found in conventional reciprocating piston combustion engines. Engine 10 includes a first compressor stage or compressor 12, which rotates within a compressor housing or shell 34, that is further coupled to two second compressor stages or compressors 14 via compressed air path 22. The second compressor may be a twin screw supercharger. Compressor shell 34 connects to an engine frame 24, which provides support and rigidity for engine 10. Compressed air from path 26 feeds to an air feed 28 that is coupled to both second compressors 14. Each compressor 14 provides a second compression action on the compressed air and mixes fuel with it just prior to combustion, which is used to extract energy and convert the force into useable work.

Figure 3:
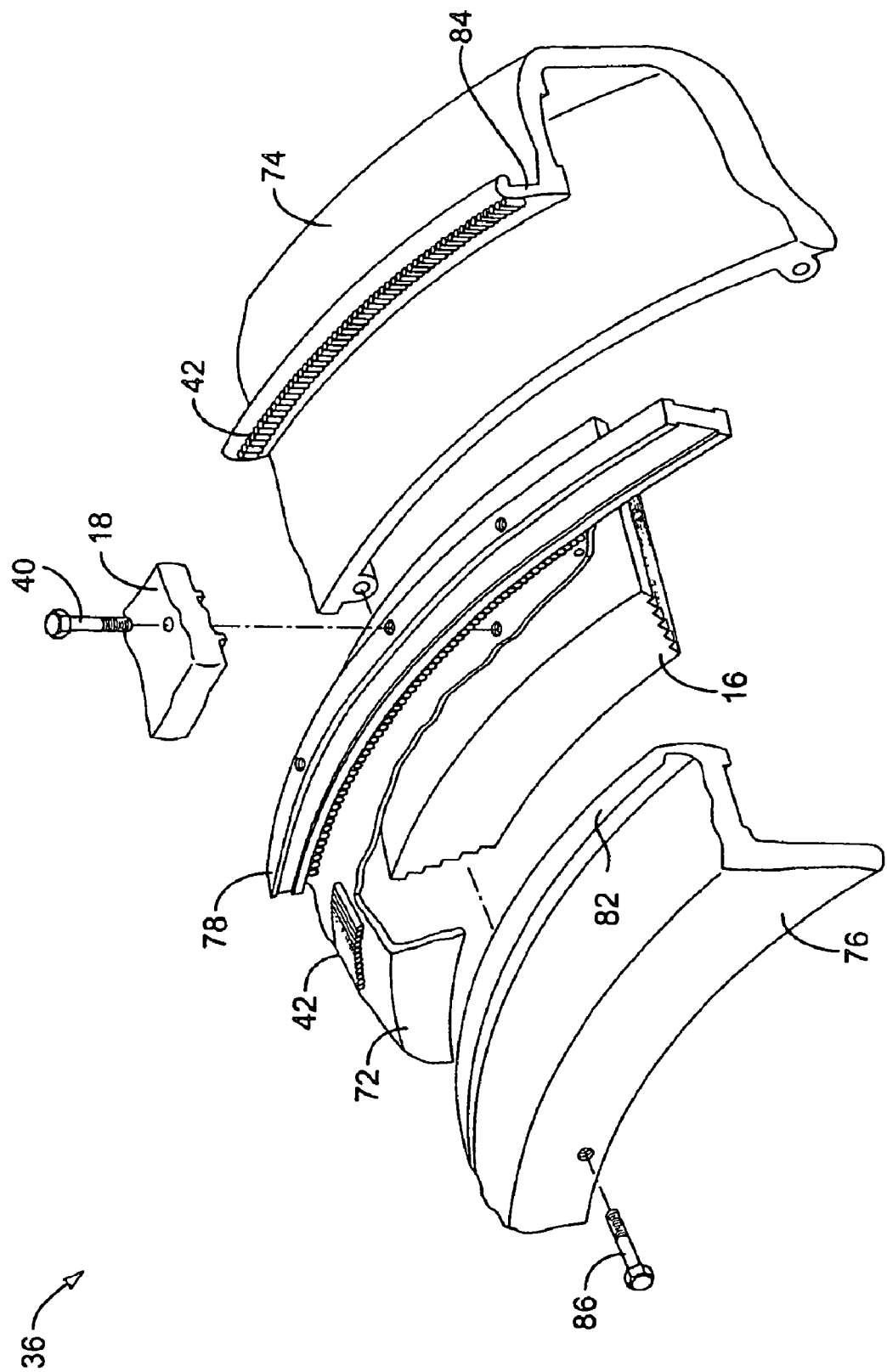
FIG. 3 illustrates an exploded view of how the engine block fits within the carrousel, in accordance with one embodiment of the invention.

Engine 10 further includes an active or first race piston 16 that travels within a path defined by a toroidal expansion race head 36, which are illustrated in greater detail in FIG. 3. Piston 16 has a passive or second race piston 17, located 180 degrees opposite piston 16 within the toroid defined by race head 36. A carrousel member 18 attaches to race piston 16 and 17 via a ring or armature 78 thereby allowing both pistons 16, 17 to travel within the race head 36 in fixed relation to one another. First compressor 12 mounts upon a drive shaft 20, which further connects to carrousel member 18 via a slotted or grooved connector 37, as shown in FIGS. 1 and 2.

As shown in detail in FIG. 3, and further supported in FIGS. 1 and 2, the toroidal race path within race head 36 is formed by a toroidal head sleeve 72, which is comprised of a first toroidal race head 74 and a second toroidal race head 76, which mate together to form the race or channel in which piston(s) 16, (17) operates. Race head 36 functions as a sleeve, confining both pistons to a defined path.

Second piston 17 serves two important functions. The first function is that it acts as a counter balance to first piston 16. This is important since the rotation speeds will be high enough that without the counterbalance, the engine would not work or it would vibrate severely enough to fail during operation. The second is that it serves to clear the chamber of exhaust gases after combustion and the energy from the combustion has been extracted by piston 16 used to turn carrousel member 18 and drive shaft 20. Piston 17 sweeps along and trails piston 16 to clear the exhaust gases through exhaust vent 38. In addition, second piston can act much like first piston 16 and have a combustion event occur shortly after passing one of the second compressors 14, while both pistons act to sweep out the exhaust gases simultaneously.

Bearing tracks 42 are provided to allow pistons 16, 17 to travel within the race with reduced friction. Bearing tracks 42 are located on either side of armature 78 as well as on race heads 74 and 76. A film of lubricant, such as, for example, engine oil or bearing grease, may also be utilized to coat the bearings and pistons 16, 17. Armature 78 is concentric with shaft 20 and first compressor 12. This arrangement is similar to that found in PCT Patent Application PCT/US2005/005539, incorporated by reference for all purposes.

Engine 10, as shown in detail in the cut away perspective view of FIG. 2, forms a combustion chamber 71 within race head 36 near second compressor 14 as defined by first piston 16, the race head portion (cut away in FIG. 2, but shown in FIG. 1), in which piston 16 travels and a transfer valve 50, which moves within race head 36 about a hinge 6 and also serves as the exhaust valve. Hinge 6 is connected to a fixed portion of race head 36. When first piston 16 travels within race head 36, it passes over transfer valve 50. At this time, second compressor stage 14 increases pressure of the air intake made possible by sealing the transfer valve 50 with piston 16. Once piston 16 continues and no longer blocks transfer valve 50, the transfer valve opens via a set of gear-controlled cams, or other actuating means such as chain drive or spring biased rods operating on a rotating cam, to release the compressed air within the chamber 71 as defined by piston 16, transfer valve 50 and race head 36. At the time transfer valve 50 opens, fuel is injected into this enclosed volume and a spark is added ignite the fuel-air mixture and use the combustion to drive piston 16 within race head 36. Power is extracted via carrousel member 18, which further connects to shaft 20 and allows the power to be tapped for useful purposes.

Fuel is injected via an injector 33 and ignition is provided via an igniter 35. Fuel igniter 35 can be a sparkplug or a glowplug, depending upon the fuel type utilized. Recent improvements in sparkplug technology and computer controlled timing have reduced the need for sparkplug change and engine tuneups to in excess of 100,000 miles, their location for access are not as critical as in prior designs. Designs that provide ready access to the sparkplugs for replacement are left to the skilled artisan to implement. Multiple plugs may be utilized to improve burn efficiency.

Figure 4:
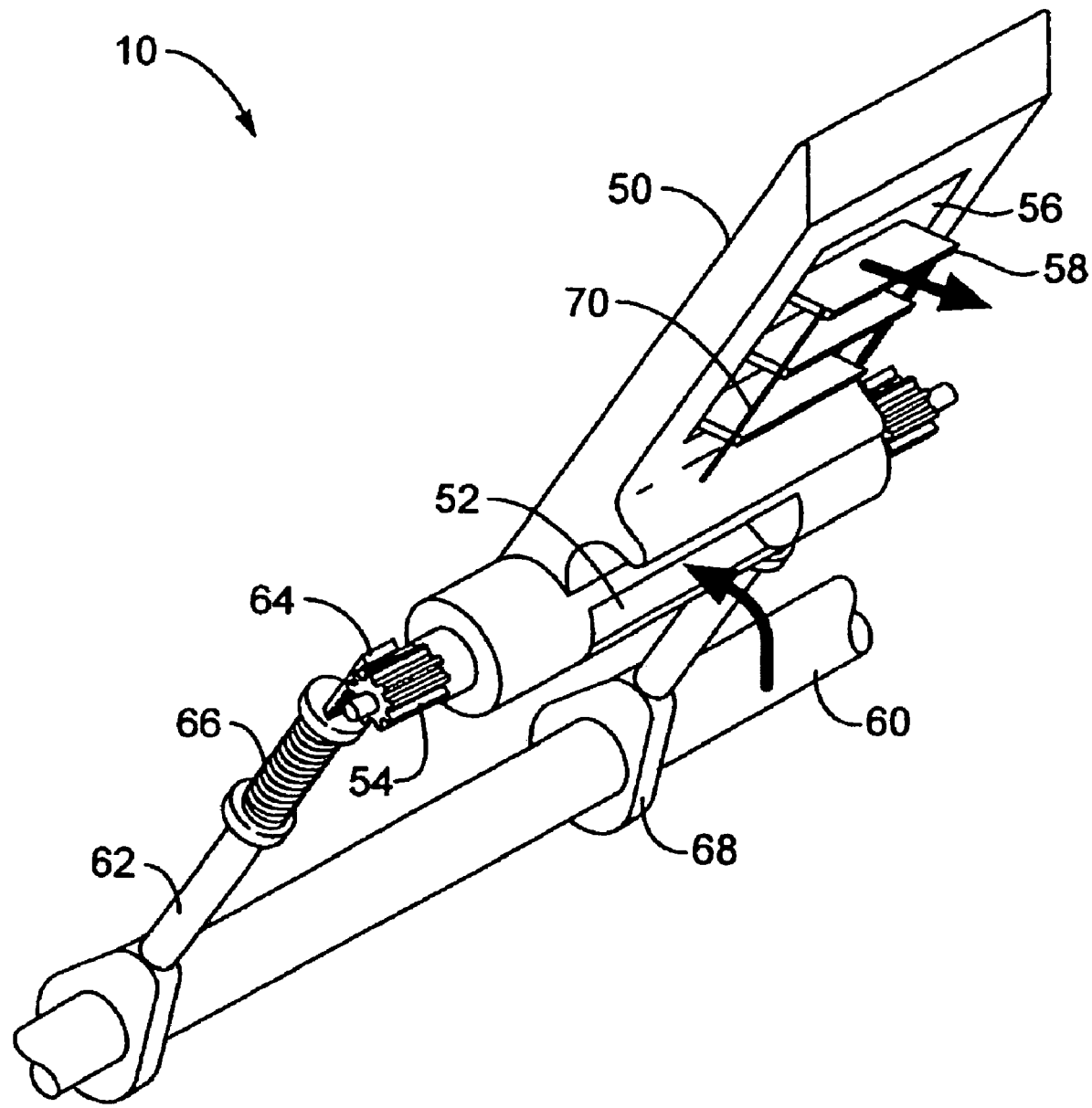
FIG. 4 depicts an exploded perspective view of the transfer valve, including the flap of FIG. 2.

Transfer valve 50 is shown in greater detail in the exploded view of FIG. 4. Valve 50 includes a vent opening 52, which serves to allow air or gases to pass there through and continue through transfer opening 56. This provides for a passage from the second compressor stage to the combustion chamber as previously described above. Valve 50 is operated by a cam actuated geared rods that mesh with gears 54 at either side of valve 50. Cam 60 includes one or more nodes 68, which rotate as the cam does to move rods 62 up and down in a timed manner. Nodes 68 are rotated so that valve 50 opens immediately after piston 16 passes over it and nodes 68 can be prepared so that they keep valve 50 in the up or open position up until the next piston 17 is very close.

Each rod 62 includes a geared end 64 that engages a gear 54. As each rod 62 moves up and down in unison, they cause the valve 50 to open or close depending on the position of cam 60. As valve 50 opens, a set of louvers 58 move to an open position, thereby opening up transfer opening 56 to allow the compressed air or gas to vent into combustion chamber 71 in a generally tangential direction to the curvature of annular race head 36. Other valve opening means are considered, which would include belt and drive wheels, intermeshed cogs engaged together to operate valve 50, or direct drive gearing attached to the drive shaft 20 to engage gears 54. Louvers 58 can be connected so that they close via a bias spring 70 when valve 50 is down and open via a fixed connector that operates to unbias the spring sufficiently long enough to direct the compressed air into chamber 71 prior to and during combustion.

After piston 16 passes over valve 50, the valve opens (radially outward in this embodiment) to release the combusted air/fuel mixture that is utilized to push piston 16 about the path. As piston 16 is driven, power is converted from the combustion event to mechanical motion as acted upon drive shaft 20, which can be coupled to a transmission system to control and optimize the power output from engine 10 for locomotive power or other types of energy conversion, i.e. electrical generators.

Turbine or toroidal piston 16 seals combustion chamber 71 when valve 50 drops in a closed position to seal second compression stage 48. Combustion chamber 71 and valve 50 form a generally cone or vee-shaped funnel that directs the combusted gases out of the chamber at a variable angle ranging from 5 to 45 degrees, with a range of 5 to 20 degrees being preferred. The angle ideally is set to be as close to perpendicular to the trailing edge of turbine piston 16 as possible, but since combustion chamber 71 is located within the body of the engine, and below turbine piston 16, complete perpendicularity to the trailing edge is not likely, but it is desired. Close perpendicularity is preferred because it acts upon turbine piston 16 in the same direction of travel, thereby increasing the momentum of travel and increasing torque during energy transfer more efficiently than in other combustion engine designs. As the engine receives more fuel, the torque will increase as the engine turns higher revolutions per minute (rpm).

Injection directly into the combustion chamber is especially appropriate in Diesel engine applications where high compressions can lead to premature ignition and delivering the fuel at the precise moment for ignition is preferred. Engine compression is directly related to efficiency and power output. Further, Diesel engines require greater compression during operation than do gasoline engines. Thus, the engine is designed robustly to accommodate the type of fuel utilized. Compression rates of 7:1 up to 12:1 are common in gasoline powered engines. Compression rates of 14:1 to 20:1 and higher are common in Diesel engines.

Exhaust vent 38 is provided to exhaust the spent gases during operation. Exhaust vent 38 opens when valve 50 opens. In one embodiment, valve 50 includes a flap that is used to seal the opening of exhaust vent 38 within the race head 36. In another embodiment, the portion sealing the vent can be independent of the valve 50, or can be left open since the moving combustion chamber effectively seals itself within race head 36 during operation and any leakage is minimal thus allowing the opening to vent 38 to be open permanently. The gases are exhausted by piston 17 as it travels within race head 36 and pushes the gases out through vent 38. The exhaust gases are then voided from engine 10 utilizing vent 38 connected to manifolds, mufflers, and exhaust pipes as can be provided by the skilled artisan.

Referring again to FIG. 3, toroidal race piston 16 and dummy piston 17 are generally cylindrically wedge-shaped having a radius for the top portion slightly smaller than that of the radius for the upper part of race 36 and a radius for the bottom portion slightly smaller than that of the radius for the lower path of the race. This arrangement allows the pistons 16, 17 to fit very precisely within the race so that any force applied to pistons 16, 17 by the combusted gas acts upon it as completely as possible rather than blow past the piston within the race thereby dissipating the force. Further, the leading and trailing surfaces are designed to mirror each other with a leading and trailing edge formed on the upper part of the piston tapering therefrom to the inner or bottom portion to form a trapezoidal-shaped piston with a convex curvature on the top portion and a concave curvature on the bottom. The edges include steps 83 or they may be smooth. Steps 83 prevent the operation in a reverse direction when valve 50 is in the up or open position.

Toroidal race piston 16 fits inside toroidal race 36. Piston 16 attaches to toroidal armature 78 and toroidal sleeve 72 via securing bolts 40. Armature 78 further secures to carrousel member 18 via one more bolts 40. It is this connection that allows the power generated by combustion to be transferred from piston 16 to carrousel member 18, which then turns drive shaft 20. Piston 16 fits within a race housing formed when first side toroidal race head 74 mates to second side toroidal race head 76 and is secured in place by a series of bolts 86 that are located along the side perimeter of the race. Toroidal sleeve 72 and armature 78 slide within race sleeve 36 upon bearings 80, which are placed on the surface of toroidal sleeve 72 and upon a lip edge 84 of side toroidal race head 74. Side toroidal race head 74 is general C shaped with the lower portion extending horizontally to mate with second side toroidal race 76, which has a portion that extends up vertically before jutting horizontally in a way that provides an endless slot in which piston 16 and toroidal sleeve 72 can travel. Armature 78 travels between edge 82, of side toroidal race 74 and edge 84, of side toroidal race head 76. Race heads 74 and 76 are secured together by a plurality of bolts 86, of other fastening means known to the skilled artisan. In this embodiment, bearings 80 are cylindrical, but ball bearings and other types of bearings are well within the art of the skilled engineer.

Figure 5:
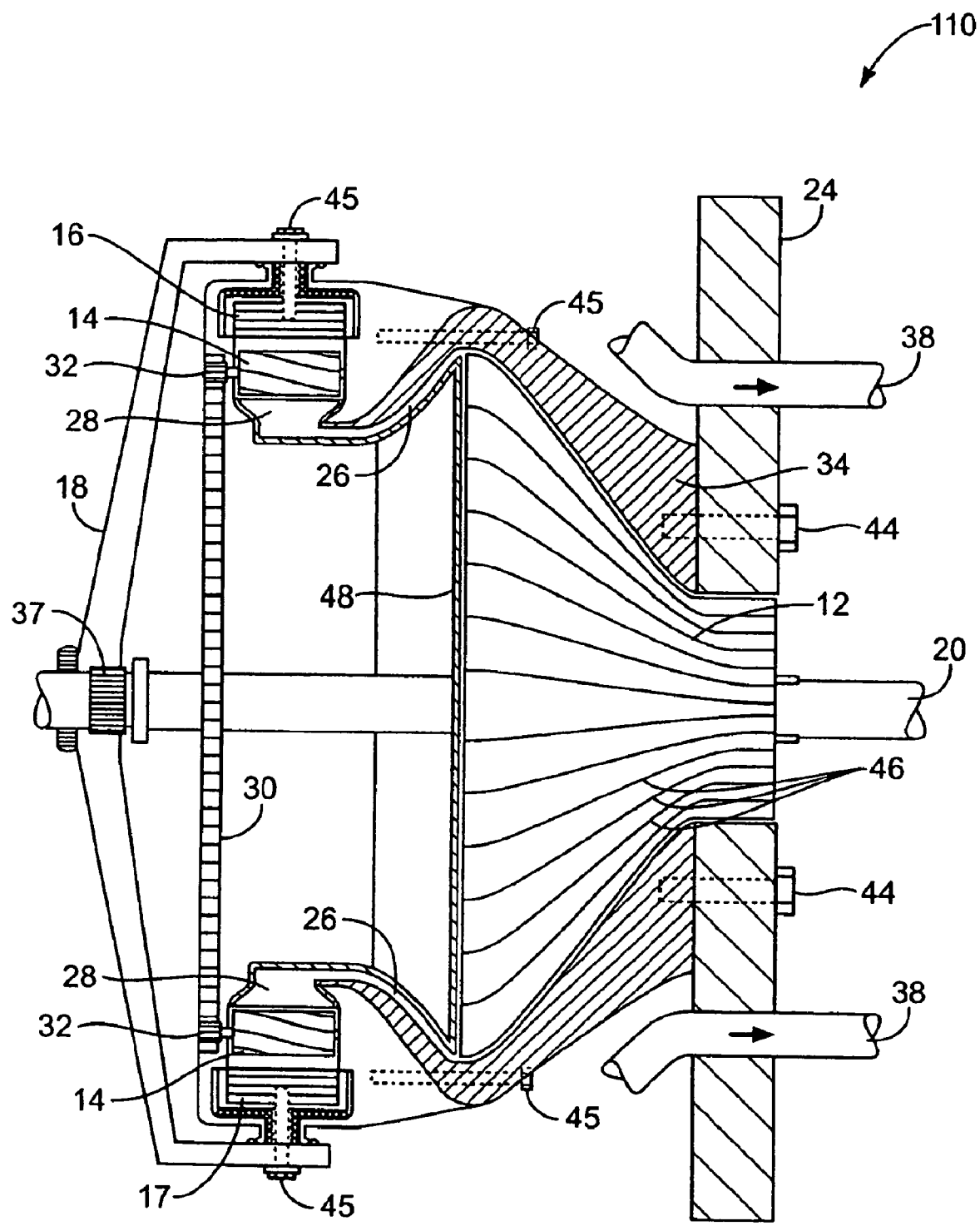
FIG. 5 illustrates a cutaway side view of a specific embodiment in accordance with the present invention.

First compressor 12 is further connected to a carrousel member 18, as illustrated in FIG. 1. Carrousel member 18 further connects to crank or drive shaft 20 via one or more keyed slots 36 or other methods known to those skilled in the art. A set of bearings 42 is found on both ends of carrousel member 18 where carrousel member 18 meets frame 24 for stability. Carrousel member 18 can also be carousel- or dome-shaped rather than C-shaped as shown in FIG. 1. The ends of carrousel member 18 need not extend to frame 24 as is shown in FIG. 5. This reduces the overall mass of carrousel member 18 and opens up the interior of engine 10 so that the service mechanic can have access to the spark plugs, fuel injectors and other mechanical elements typically serviceable during the life of the engine.

One significance of the present invention is that additional compression chambers and combustion chambers can be placed radially about the camshaft, thereby increasing power within the same space. Since first compressor 12 is basically cylindrical and travels about a circular path as a centrifugal compressor, additional combustion chambers and compression chambers as are desired can be connected to it. Although a minimum of one combustion chamber is necessary, ideally, each engine will have a combustion chamber mounted 180 degrees opposite the first. Third and fourth chambers can be added as pairs, with each opposing the other. The symmetry of the opposing pistons minimizes vibration and noise during operation. The design can include two pistons 16, 17, or additional pairs just like pistons 16 and 17.

Figure 6:
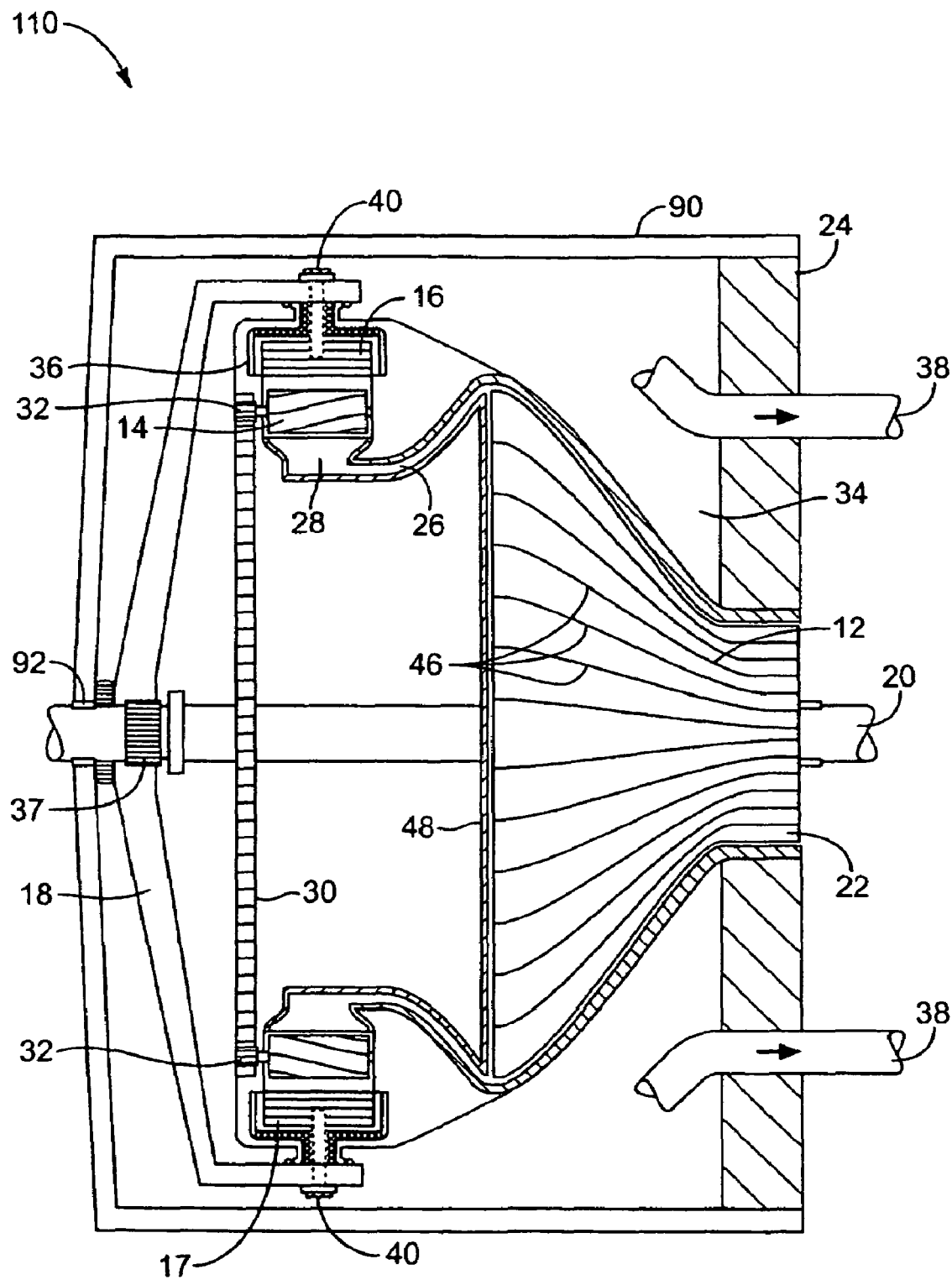
FIG. 6 illustrates a cutaway side view of another specific embodiment in accordance with the present invention.

FIG. 6 illustrates a cutaway side view of an alternative embodiment of the engine of the present invention defined as engine 110. Engine 110 includes an air intake 22 coupled to first compressor 12, second compressor 14, annular race 36, and pistons 16, 17 as previously described, and operate in the same manner. Engine 110 does include an engine enclosure 90 that connects to engine frame 24 to form a box conforming to the shape of the engine inside it. Carrousel member 18 connects to each piston 16, 17 via bolts 40 and to shaft 20, while shaft 20 can extend out of enclosure 90, which is sealed by bearings 92 that are generally sealed so as to prolong life without needing constant lubricant replacement. Second compressors 14 are shown to be driven by a gear mechanism that includes gear 30, mounted on shaft 20, which engage gears 32, which operate the second compressors. The air flows through an air path 26 between the first and second compressors and then to air feed 28, which is connected to second compressor 14. First compressor 12 also includes vanes 46, which capture and direct the air to the second compressor. Exhaust ports 38 serve to exhaust the spent gases after combustion.

Figure 7:
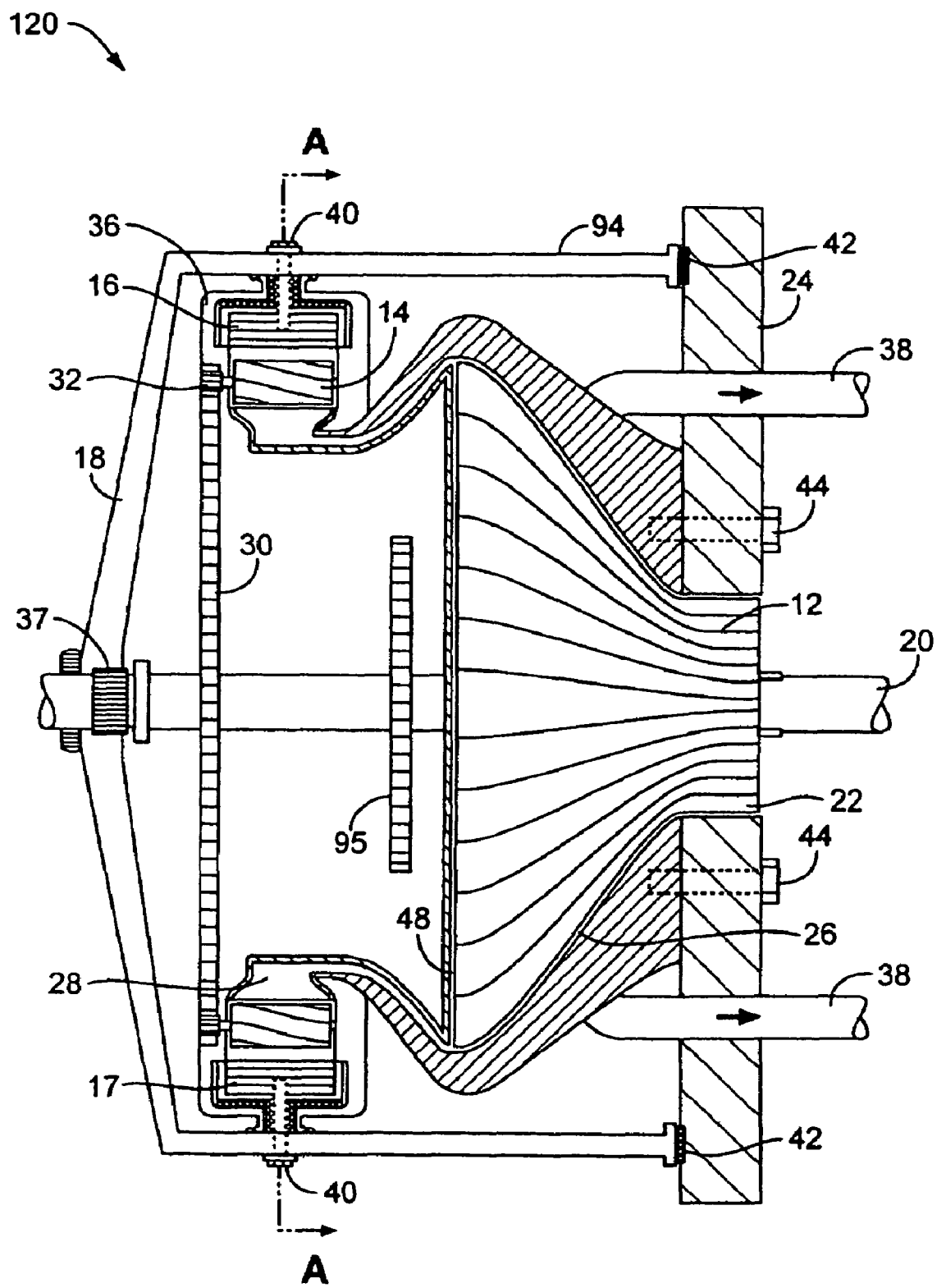
FIG. 7 illustrates a cutaway side view of another specific embodiment in accordance with the present invention.

FIG. 7 illustrates a cutaway side view of yet another embodiment of the engine of the present invention. Specifically, engine 120 is different from that of FIG. 6 in that carrousel member 18 actually forms an enclosure about engine 120 and includes a skirt 94 that fits against engine frame 24 via movable bearings 42, so that carrousel member 18 can rotate freely as pistons 16, 17 move during combustion. Again each piston 16, 17 couples carrousel member 18 via bolts 40. Additionally, gear 30 mounts to shaft 20 and drives gears 32 that drive each second compressor 14. An auxiliary gear 95 can be included and mounted on shaft 20 like gear 30, and be used internally to operate additional devices, such as an oil pump, a water pump, et cetera.

Engine housing 34 encloses first compressor 12 and connects to engine frame 24 via a series of bolts 44. Engine housing 34 is strong enough to hold race 36 as well. An engine wall 48 further encloses first compressor 12. Exhaust ports 38 again serve to exhaust the spent gases after combustion.

Figure 8:
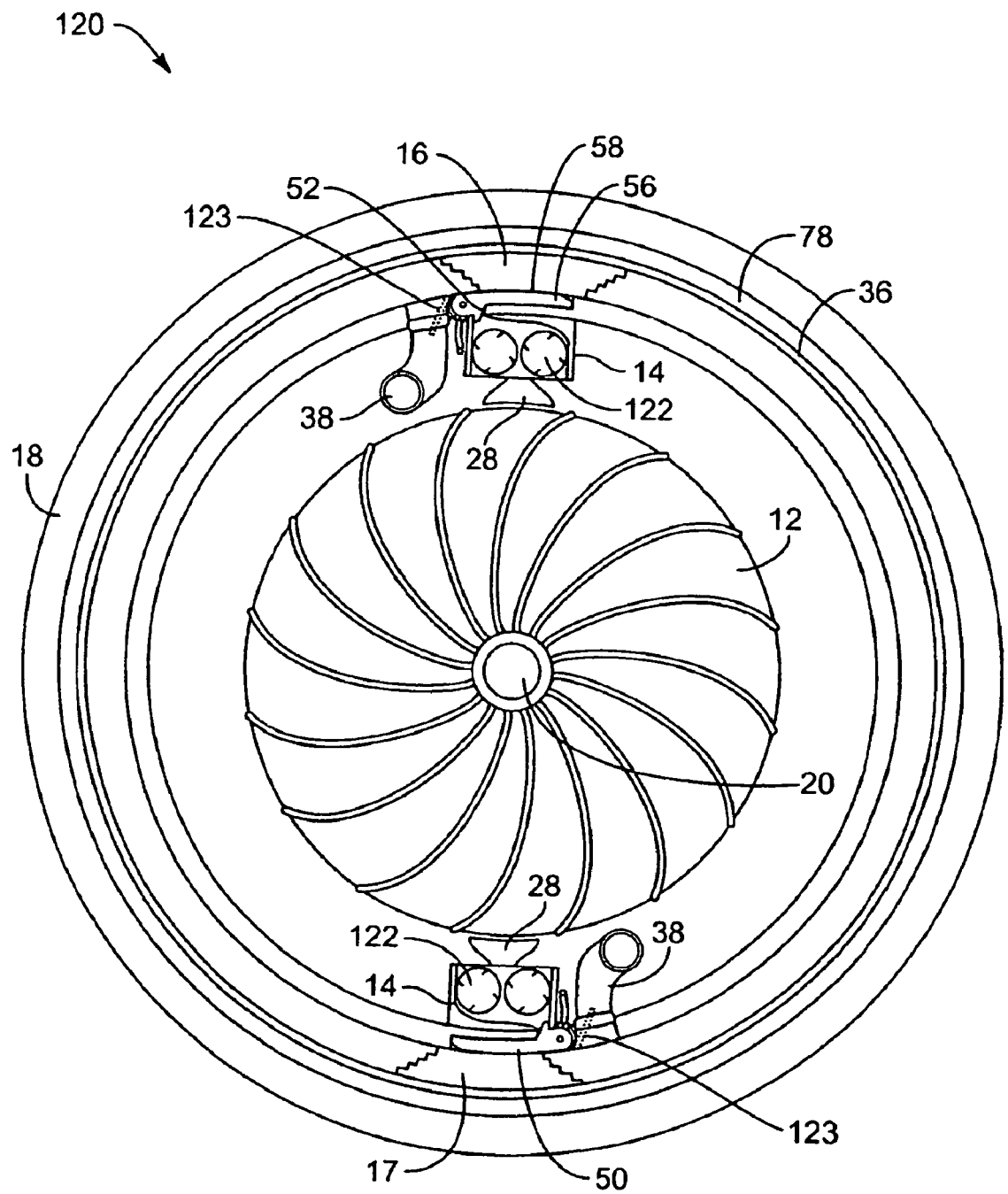
FIG. 8 illustrates a cutaway front view of the engine of FIG. 1.
Figure 9:
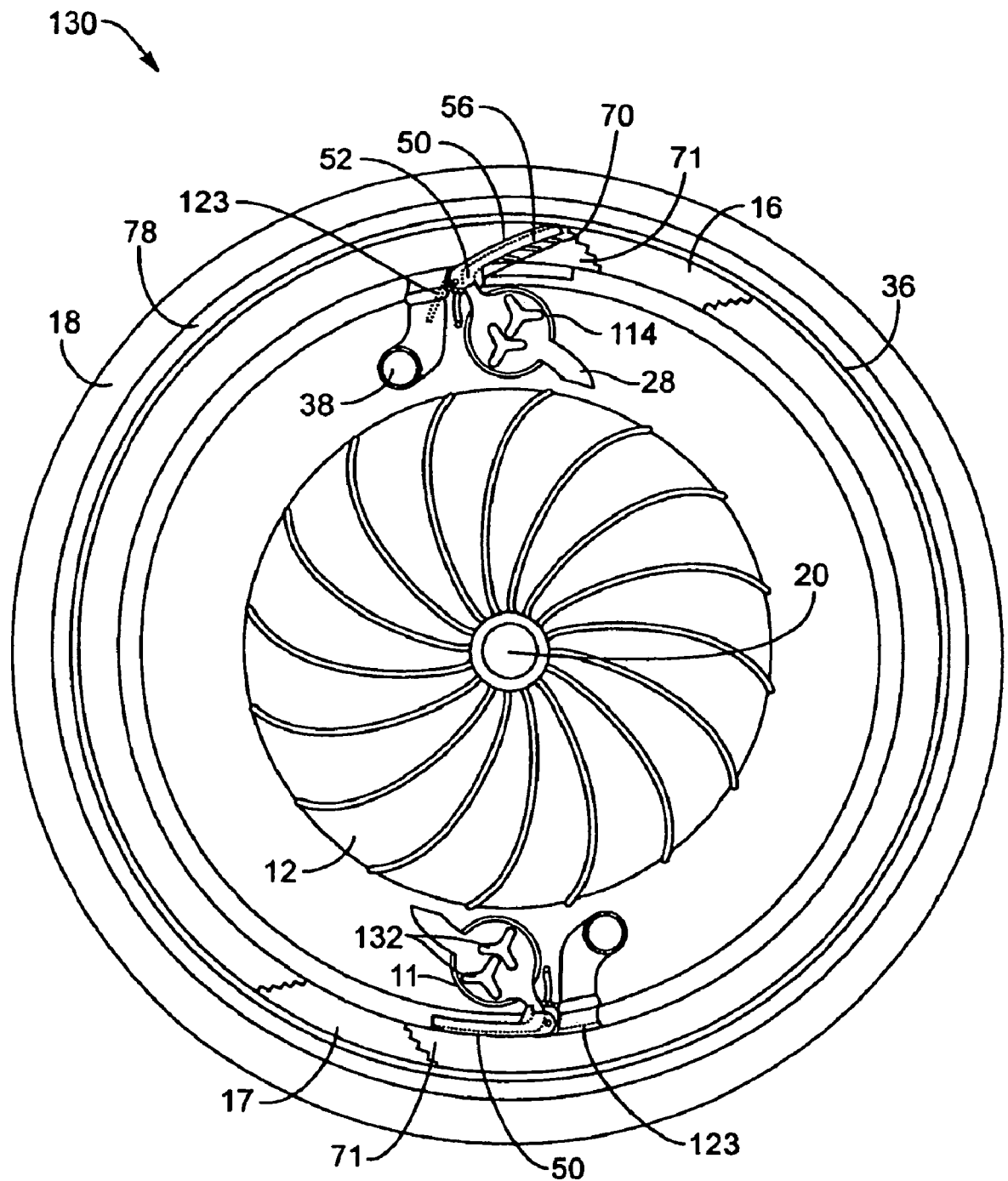
FIG. 9 illustrates a cutaway front view of an alternative embodiment of the engine of FIG. 9.

FIG. 8 illustrates a cutaway front view of engine 120 of FIG. 7. Engine 120 is shown with transfer valves 50 is the closed position and sealed by piston 16, 17. Also shown is second compressor 14, which is a rotary screw type positive displacement compressor having a pair of working rotors 122. Carrousel member 18 is concentric with shaft 26, as is toroidal armature 78 which connects to each piston 16, 17. Pistons 16, 17 rotate within toroidal race head 36 during operation. Compression starts with first compressor 12 drawing in air from the air intake (not shown) and compressing it centrifugally to air chambers 28, where the compressed air is received by second compressor 14 and compressed yet a second time. The compressed air flows through vent 52 as directed by louvers 56 within valve 50 when valve 50 opens, as is shown in FIGS. 2 and 9. Exhaust gases vent through exhaust ports 38 and are sealed by vent doors 123, which are in ghosted outline.

FIG. 9 illustrates an alternative cutaway front view of engine 120 of FIG. 7. Engine 130 is shown with the top transfer valve 50 in the open position after pistons 16, 17 pass over both the top and bottom transfer valves 50. Also shown is second compressor 114, which is a roots type positive displacement compressor having a pair of working rotors 132. Carrousel member 18 is concentric with shaft 20, as is toroidal armature 78, which connects to each piston 16, 17. Pistons 16, 17 rotate within toroidal race head 36 during operation. Compression starts with first compressor 12 drawing in air from the air intake (not shown) and compressing it centrifugally to air chambers 28, where the compressed air is received by second compressor 14 and compressed yet a second time. The compressed air flows through vent 52 as directed by louvers 56 within valve 50 when valve 50 opens, as is shown in FIGS. 2 and 9. Exhaust gases vent through exhaust ports 38 where the vent door 123 at the top of FIG. 9 is opened.

Figure 10:
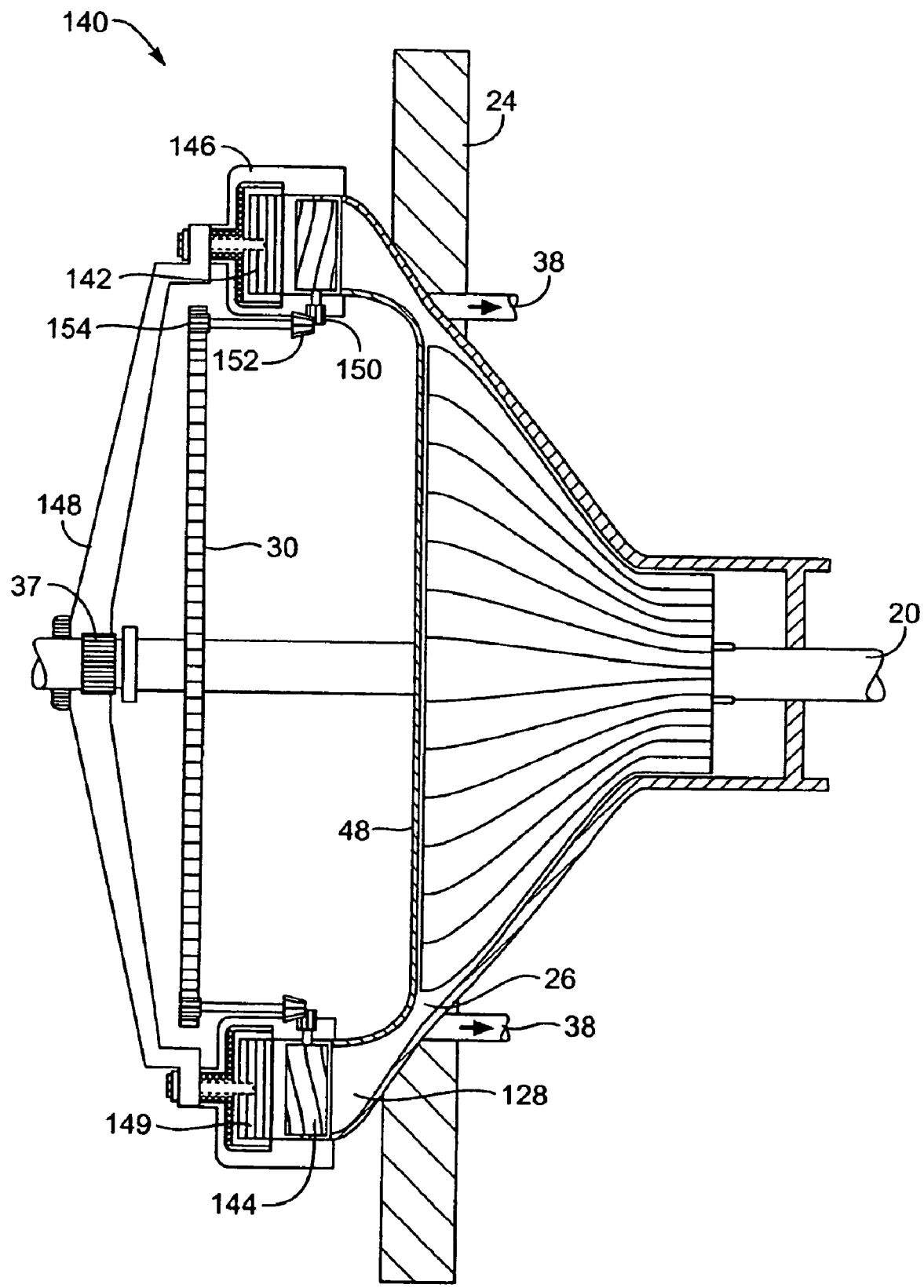
FIG. 10 illustrates a cutaway side view of another specific embodiment in accordance with the present invention wherein the drive piston and second compressors are mounted sideways.

FIG. 10 illustrates yet another alternative embodiment. In this example, engine 140 places turbine piston. 142 adjacent to second compressor stage 144 and both are shifted 90 degrees as compared to the embodiment in FIG. 1. Piston 142 travels within piston race 146. A transfer valve (not shown) like that in FIGS. 2 and 4, serves to close off second compressor stage 144 from race 146. A combustion chamber (not shown), exactly like that of FIGS. 2 and 9, is formed by the back edge of piston 142, the opened valve as described in FIGS. 2 and 4, and the walls of race 146 at where piston 142 passes over and uncovers the valve to allow it to open. Armature 148 connects to shaft 20 and to piston 142 and to opposing dummy piston 143. Armature 148 has an elongated C-shape in this embodiment. Air is drawn in via first compressor 12, delivered through air path 26 to air chamber 128, before being compressed a second time by second compression stage 144. The second stage of compression occurs while the valve is closed up until piston 142 passes it on its circular journey. The valve opens as previously mentioned with respect to the prior embodiments and the compressed air is released into the combustion chamber. At that time, fuel is injected into the combustion chamber and a spark is provided to ignite the fuel air mixture, causing it to combust and release its chemical energy and act on the back end of piston 142, thus driving it in its circular path. As piston 142 is forced to move, it causes armature 148 to act on shaft 20 where it connects at slots 37.

The length of time of the combustion varies depending upon the desired output and fuel efficiency of the engine. In typical applications, the fuel air mixture combusts in an instant with no more fuel or air being added until the next cycle. In other applications since first compressor 12 and second compressor stage 142 can operate in a continuous mode, additional compressed air can be released into the transfer race 146 along with a continuous input of fuel to burn and further drive piston 142. This allows for more power to be delivered during one combustion event over that of merely having a single explosive moment found in earlier embodiments or in the prior art of combustion piston engines.

Second compressor stage 144 can be driven directly, with an independent motor, or indirectly, via a cog and gear assembly as shown in FIG. 10. Here, gear 30 turns as shaft 20 turns. Gear 30 then engages cog 154, which share a common shaft with cog 152. As cog 154 turns cog 152, cog 152 engages cog 150 to power second compressor stage 144. Other drive mechanisms will be apparent to the skilled artisan. For example, belts and pulleys are also contemplated to drive second compressor stage 144.

Since piston 142 operates as the work piston, dummy piston 149 operates as the exhaust piston and as a counterbalance to piston 142 to reduce vibration and shudder. When the valve opens, the combusted gases are vented through vents 38 much like has been described previously. In an alternative embodiment, since the dual compressor design doesn't require the steps of compression similar to those of a conventional reciprocating piston drive engine, both piston 142 and 146 can be active in performing both functions of forming part of the combustion chamber and pushing out the exhaust gases while traveling through the annular race head. This approach provides for a smoother power band while the first embodiment of utilizing only piston 142 as the work piston receives more power per combustion step by allowing a longer compression time before the work piston passes the valve. Further, the first approach provides for a cleaner burn as most of the exhaust gases are exhausted with dummy piston 146 serving to push the exhaust gases out through valve 50 and exhaust port 38 while valve 50 acts as a stop when open forcing the gases to exit through port 38. Further still, during the stage or step of exhausting the gases, the valve over which piston 142 passes can be closed for a longer duration prior to the combustion step thus generating a higher compression. Accordingly, during normal or single piston operation, the valves 50 opposite one another open and close out of synch with one another, thus while the first one is open, the second is closed and vice versa. This continues in an alternating manner to optimize both the compression step and exhaustion step.

The engine design provides for an improvement over reciprocating engines in that the combustion chamber cools down much more rapidly in engine 10 since the combustion chamber is ever expanding. Less cooling means are then necessary to protect the engine from overheating over that of a conventional reciprocating piston design providing the same power output as that as engine 10. Further, since engine 10 operates as a piston engine with turbine-like properties, as opposed to a reciprocating piston that must change directions violently during operation, engine 10 operates more efficiently with less wasted power due to fewer parts and to having turbine piston 142, or any turbine-hybrid piston utilized within any of the engines disclosed according to the invention, travel within an endless loop with no violent direction changes. Thus the novel engine 10 operates at lower temperatures with less mechanical support, runs smoother than conventional reciprocating engines, and delivers more torque and useful power with the turbine pistons operating on an armature greater than a conventional drive shaft connected to reciprocating pistons.

Figure 11:
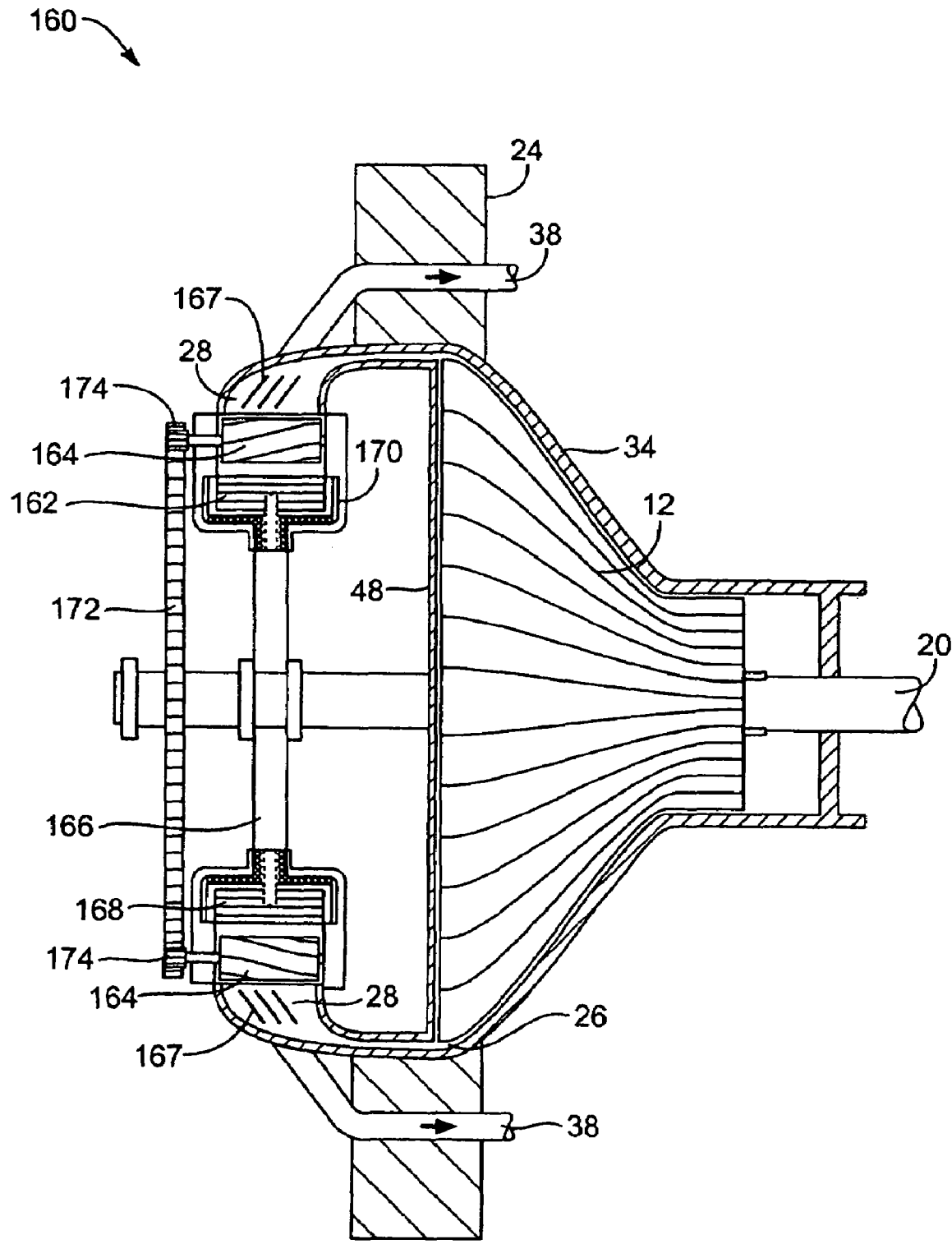
FIG. 11 illustrates a cutaway side view of another specific embodiment in accordance with the present invention wherein the drive piston and second compressors are mounted inside the radius of the racehead.

FIG. 11 discloses another alternative embodiment of the novel engine 160. Engine 160 reverses the position of turbine piston 162 with second compressor stage 164. Thus, compressor stages 164 are on the outer radius and turbine piston 162 and opposing piston 168 are in the inner radius. Each piston 162 and 168 are attached to drive shaft 20 via armature 166, which is now coplanar with both pistons 162 and 168 and with both compressor stages 164. This embodiment is more compact than the previous embodiments, such as engine 10 of FIG. 2 and engine 140 of FIG. 10. This provides for a smaller engine, but with the same available torque for the same race head volume and fuel applications. Further, it is easier to access the spark plugs and fuel delivery means since they are now located on the outside of the radius of the annular race head 170.

Engine 160 also includes first compressor 12 mounted on drive shaft 20. First compressor 12 is generally enclosed by housing 34 and by engine wall 48. Compressed air from first compressor 12 is delivered to second compressor stage 164 via air path 26 and air feed 28. The passage way between the first compressor 12 and second compressor stage 164 has a series of generally parallel stator blades 167 that guide the air from the first compressor 12 to the second compressor stage 164 in a uniform flow manner that guides and captures the air to prevent it from returning to the first compressor 12 and then feeds it to the second compressor stage 164. The engine 160 is braced by engine frame 24, which is made with a metal or metal alloy, such as steel, steel alloys, magnesium, aluminum, and alloys thereof. Further, engine 160 can be made from composite and exotic materials such as carbon graphite, ceramic, or titanium, or a mixture of the various materials as is appropriate. These exotic materials and improved metal alloys provide for a lighter, stronger engine than would be otherwise possible using merely iron or steel for the majority of the active parts and support parts utilized within the manufacture and construction of the engines as invented.

Engine 160 also includes a gear 172, connected to drive shaft 20 along the same axis, which can provide additional work to the engine. For example, as illustrated in FIG. 11 and previously described with respect to FIG. 10, gear 172 can operate to power each second compressor stage 164 via a cog 174. Other power applications will be readily apparent, such as operating peripheral devices, such as, water pumps, alternators, air conditioner pumps, etc.

Figure 12:
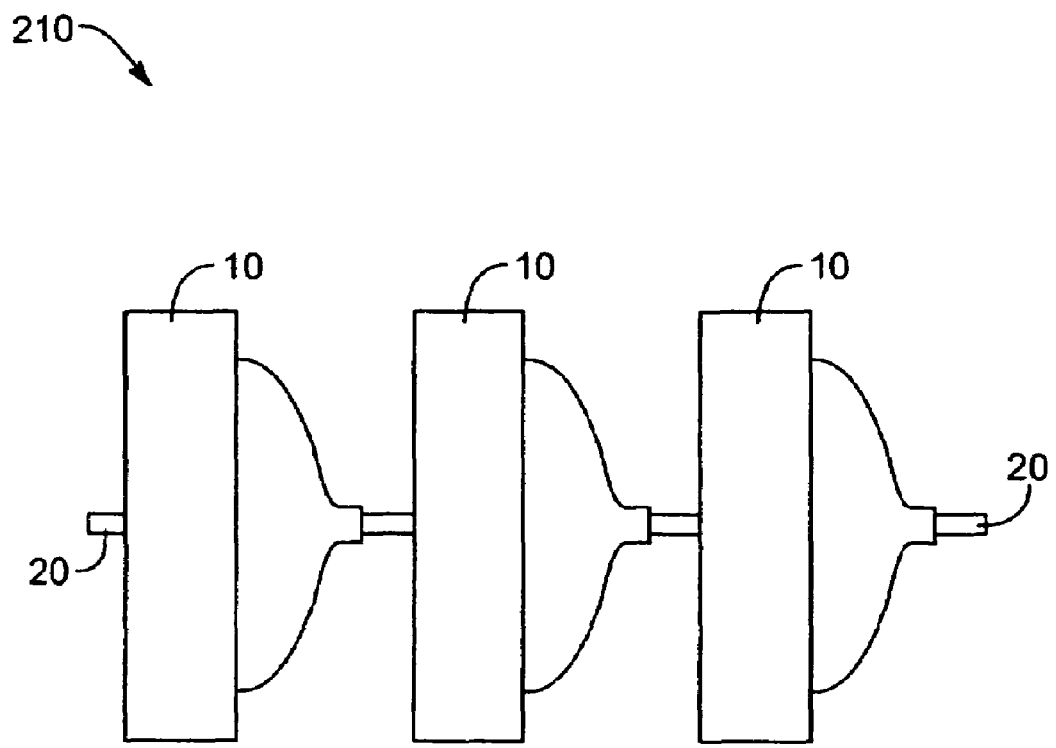
FIG. 12 depicts a view of an compound engine having multiple engine stages based on the engine of the present invention.

FIG. 12 illustrates how an engine 210 can include multiple engines 10 placed in tandem with one another on the same drive shaft 20. Each engine 10 operates as previously described and if the pistons in each of engine 10 fires in a sequential order, a smooth power band can be obtained since power is provided more uniformly over each cycle. Thus, with two engines 10, a minimum of four combustion stages occur; if there are 3 engines, then a minimum of six combustion stages occur. As such, the number of combustion stages is at a minimum twice the number of engines 10 connected to the same drive shaft.

Figure 13:
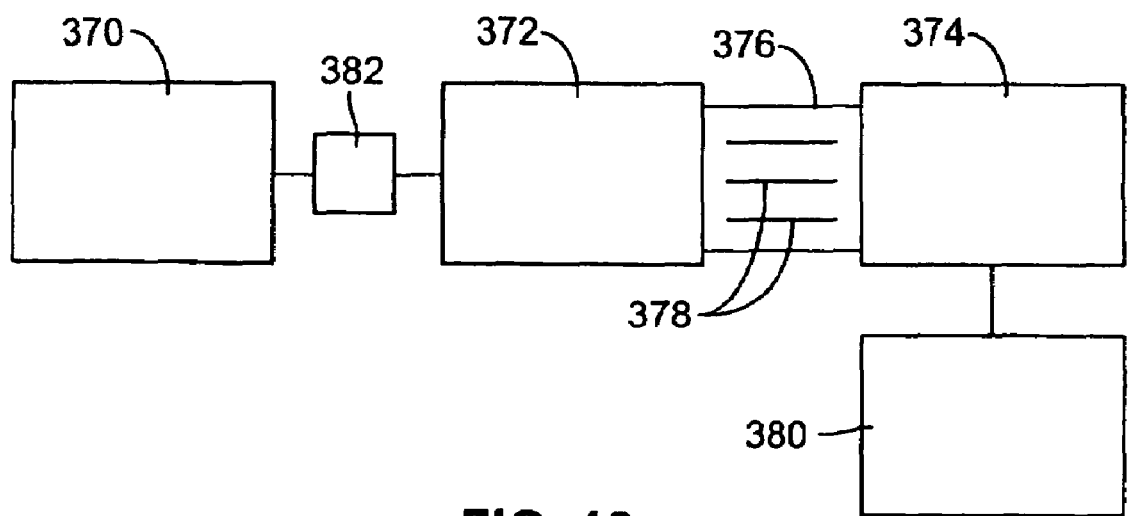
FIG. 13 is a schematic diagram of the air intake system in accordance with the present invention.

Air intake is drawn through a filtering system 370, shown in the schematic diagram of FIG. 13, and is conventional within the art. Air is received from filtering system 370 and then is compressed via a centrifugal charger 372 and then a positive displacement compressor 374, which is typically a super charger, prior to entering the combustion chamber 380. Before the compressed air from centrifugal compressor 372 reaches positive displacement compressor 374, it passes through an air path 376. The passage way or air path 376 between the first compressor 372 and second compressor 374 has a series of generally parallel stator blades 378 that guide the air from the centrifugal compressor 372 to the positive displacement compressor 374 so that the compressed air flows in a uniform manner by first capturing the compressed air and guiding it to compressor 374 without blowing back to compressor 372. This prevents the air flow from the first compressor 372 to shear across the second compressor 374 thus interrupting air flow, which would cause engine stall or hesitation. Since compressing air causes it to heat up, an air intercooler 382 can also be utilized to reduce the temperature of the air prior to compression via the turbo charger 372 or super charger 374. Cooler air is denser than warm air, thus increasing the air to fuel ratio to provide greater performance and efficiency during operation.

In review, The engine is a multistage compressor turbine-hybrid piston engine. Air feeds to the engine via an intake manifold. The first compressor stage compresses the air so as to feed it into a second compressor stage. The second compressor stage prepares the compressed air to be mixed with fuel and ignited for combustion to turn the toroidal piston. Combustion takes place after the opening of the valve that seals second compressor stage from the annular race in which the turbine piston travels. After the turbine piston passes the valve, the valve opens and the air is released and mixed with fuel and then immediately combusted to release the chemical energy in the fuel air mixture and convert it to mechanical energy. This drives the toroidal piston around the toroidal race head. While the air release and exhaust valve is up, exhaust is driven out by the secondary or dummy toroidal piston placed 180 degrees opposite the real toroidal piston. The air release valve and exhaust valve is constructed as a unitary element. The air release valve acts as a back wall for the combustion chamber, which also includes the portion of the race enclosed by the valve and by the turbine or toroidal piston. The back wall forces the combustion to drive the toroidal piston forward in a manner similar to that of a conventional reciprocating piston head design. The exhaust half of the valve unseats at the exact same time letting out the exhaust gas.

The same sequence occurs 180 degrees later. This provides a 2-cycle engine, which operates twice as often as that as a conventional 4-cycle engine combustion engine. Combustion does not take place in the reciprocating compressor as is required in the conventional combustion engine, but rather, it takes place only in the toroidal race head, when the compressed air that was transferred from the multiple compressor stages to the temporary combustion chamber is released and mixed with fuel and ignition fired when the air release and exhaust valve is topped out on the toroidal sleeve or race. During operation, the transfer valve opens just after the toroidal piston passes over it and the transfer valve opposite the opening one remains closed so that compression can build. Once the first combustion step has occurred, then the toroidal head passes over the closed second transfer valve, which then opens immediately after the toroidal piston passes clear of it to form the expanding combustion chamber for a second fuel air mix and ignition event while the first or top transfer valve remains closed during this period until the toroidal piston returns during its revolution. Meanwhile, the dummy piston or exhaust counterbalance piston sweeps out the spend gases through the exhaust port opened while one of the transfer valves is open. This and other details are highlighted in greater detail as described above and illustrated in the figures.

Thus, a genuine two cycle engine is disclosed. With one rotation of the active toroidal piston and the counterbalance or dummy piston, combustion and exhaust occurs at least twice within one cycle.

The novel engine is intended to be a universal application engine. Since it is a two cycle engine, it can be utilized in two cycle applications such as for motorcycles, snowmobiles, recreational boat engines, among others. Further, the novel engine can be constructed to operate in long use applications such as in power plants, heavy construction equipment, semi trucks, locomotive engines, and sea going vessels. Furthermore, the novel engine can be utilized in aircraft since it provides a greater power output than conventional four cycle engines. Additionally, the novel engine can be utilized in passenger automobiles, such as cars and trucks, buses, and heavy trucks.

Those skilled in the art having the benefit of the present teachings as set forth herein above may effect numerous modifications thereto. These modifications may be construed as falling within the scope of the present invention as set forth in the appended claims.

The invention claimed is:

1. A combustion engine comprising:
an air intake;
a first compressor stage comprising a centrifugal compressor, coupled to the air intake;
a second compressor stage, coupled to the first compressor stage, said second compressor stage comprising two positive displacement compressors;
an annular race head, having a given radius and an enclosed path conforming substantially to the radius;
a transfer valve, placed between the second compressor stage and the annular race head serving as part of the interior surface therein, to seal off the annular race head from the first compressor stage and the second compressor stage during compression and to conduit air compressed first by the first compressor stage and then by the second compressor stage to the annular race head;

a drive shaft connected to a carousel member, and upon which drive shaft the first compressor stage is mounted, said drive shaft rotatably coupled to the first compressor and that operates the first compressor stage and transfers power generated by the engine to a useful purpose;

a first toroidal piston and a second toroidal piston, the first toroidal piston and the second toroidal piston opposite each other in the annular race head and coaxially coupled to the drive shaft, and which travel within the annular race head in a circular path;

a combustion chamber, formed within the race head when and where the first toroidal piston passes the transfer valve and the transfer valve opens immediately after the first toroidal piston passes over the transfer valve;

a fuel supplier, coupled to the annular race head and the combustion chamber, that delivers fuel to the compressed air to provide a fuel/air mixture that has been compressed within the combustion chamber; and ignition means, coupled to the combustion chamber, that ignites the compressed fuel/air mixture within the combustion chamber with the resulting force acting upon the first toroidal piston, pushing the first toroidal piston within the annular race head thereby turning the drive shaft, wherein power generated by combustion is transferred from the first toroidal piston to the carousel, which then turns the drive shaft.

2. The combustion engine according to claim 1 wherein the first compressor stage is driven by the drive shaft to impel air from a first volume through the air intake to the second compressor stage in a second volume smaller than the first volume.

3. The combustion engine according to claim 1 wherein the second compressor stage is a positive displacement compressor that forces the compressed air in the second volume to the combustion chamber.

4. The combustion engine according to claim 3 wherein the second compressor stage is a root supercharger.

5. The combustion engine according to claim 1 further comprising an air path, located between and connecting the first compressor stage and the second compressor stage, having one or more stator blades in parallel to the direction of air flow.

6. The combustion engine according to claim 1, wherein the second toroidal piston counterbalances the first toroidal piston and exhausts the combusted fuel/air mixture through an exhaust port, which is coupled to the annular race head.

7. The combustion engine according to claim 1 wherein the first compressor stage comprises blades.

8. A combustion engine comprising:

an air intake;

a first compressor stage comprising a centrifugal compressor, coupled to the air intake;

a second compressor stage, coupled to the first compressor stage, said second compressor stage comprising two positive displacement compressors;

an annular race head, having a given radius with the second compressor stage placed outside the given radius and forming an enclosed path conforming substantially to the radius;

a transfer valve, placed between the second compressor stage and the annular race head serving as part of the interior surface therein, to seal off the annular race head from the first compressor stage and the second compressor stage during compression and to conduit air compressed first by the first compressor stage and then by the second compressor stage to the annular race head;

a drive shaft connected to a carousel member, and upon which drive shaft the first compressor stage is mounted, said drive shaft rotatably coupled to the first compressor, and that operates the first compressor stage and transfers power generated by the engine to a useful purpose;

a first toroidal piston and a second toroidal piston, the first toroidal piston and the second toroidal piston opposite each other in the annular race head and coaxially coupled to the drive shaft, and that travel within the annular race in a circular path;

a combustion chamber, formed within the race head when the first toroidal piston passes the transfer valve and the transfer valve opens immediately after the first toroidal piston passes over the transfer valve;

a fuel supplier, coupled to the annular race head and the combustion chamber, that delivers fuel to the compressed air to provide a fuel/air mixture that has been compressed within the combustion chamber; and ignition means, coupled to the combustion chamber, that ignites the compressed fuel/air mixture within the combustion chamber with the resulting force acting upon the first toroidal piston, pushing the first toroidal piston within the annular race head thereby turning the drive shaft, wherein power generated by combustion is transferred from the first toroidal piston to the carousel, which then turns the drive shaft.

9. The combustion engine according to claim 8 wherein the first compressor stage is a centrifugal compressor driven by the drive shaft to impel air from a first volume through the air intake to the second compressor stage in a second volume smaller than the first volume, and further comprising an air path, located between and connecting the first compressor stage to the second compressor stage, that has one or more stator blades in parallel to the direction of air flow.

10. The combustion engine according to claim 8 wherein the second compressor stage is a positive displacement compressor that forces the compressed air in the second volume to the combustion chamber.

11. The combustion engine according to claim 10 wherein the second compressor stage is a twin screw supercharger.

12. The combustion engine according to claim 10 wherein the second compressor stage is a root supercharger.

13. The combustion engine according to claim 8, wherein the second toroidal piston counterbalances the first toroidal piston and exhausts the combusted fuel/air mixture through an exhaust port, which is coupled to the annular race head.

14. The combustion engine according to claim 8 wherein the transfer valve comprises a set of movable louvers that are closed when the transfer valve is closed during compression and open when the transfer valve is open, wherein the louvers direct the compressed air generally tangentially to the radius of the annular race head.

15. A combustion engine comprising:

an air intake;

a first compressor stage comprising a centrifugal compressor, coupled to the air intake;

a second compressor stage, coupled to the first compressor stage, said second compressor stage comprising two positive displacement compressors;

an annular race head, having a given radius and an enclosed path conforming substantially to the radius, the second compressor stage lying cylindrically coplanar to the given radius;

a transfer valve, placed between the second compressor stage and the annular race head serving as part of the interior surface therein, to seal off the annular race head from the first compressor stage and the second compressor stage during compression and to conduit air compressed first by the first compressor stage and then by the second compressor stage to the annular race head;

a drive shaft connected to a carousel member, and upon which drive shaft the first compressor stage is mounted, said drive shaft rotatably coupled to the first compressor, and that operates the first compressor stage and transfers power generated by the engine to a useful purpose;

a first toroidal piston and a second toroidal piston, the first toroidal piston and the second toroidal piston opposite each in the annular race head and coaxially coupled to the drive shaft, and that travel within the annular race in a circular path;

a combustion chamber, formed within the race head when the first toroidal piston passes over the transfer valve and the transfer valve opens immediately after the first toroidal piston passes over the transfer valve;

a fuel supplier, coupled to the annular race head and the combustion chamber, that delivers fuel to the air after intake to provide a fuel/air mixture that has been compressed within the combustion chamber; and ignition means, coupled to the combustion chamber, that ignites the compressed fuel/air mixture within the combustion chamber with the resulting force acting upon the first toroidal piston, pushing the first toroidal piston within the annular race head thereby turning the drive shaft, wherein power generated by combustion is transferred from the first toroidal piston to the carousel, which then turns the drive shaft.

16. The combustion engine according to claim 15 wherein the first compressor stage is driven by the drive shaft to impel air from a first volume through the air intake to the second compressor stage in a second volume smaller than the first volume.

17. The combustion engine according to claim 15 wherein the second compressor stage is a positive displacement compressor that forces the compressed air in the second volume to the combustion chamber.

18. The combustion engine according to claim 17 wherein the second compressor stage is a twin screw supercharger.

19. The combustion engine according to claim 15 wherein the transfer valve comprises a set of movable louvers that are closed when the transfer valve is closed during compression and open when the transfer valve is open, wherein the louvers direct the compressed air generally tangentially to the radius of the annular race head.

20. The combustion engine according to claim 15, wherein the second toroidal piston counterbalances the first toroidal piston and exhausts the combusted fuel/air mixture through an exhaust port, which is coupled to the annular race head.

* * * * *